United States Patent
Langry

(10) Patent No.: US 8,875,571 B2
(45) Date of Patent: Nov. 4, 2014

(54) DETECTOR OF PRESENCE OF A LIQUID

(75) Inventor: Pierre Langry, Teteghem (FR)

(73) Assignee: Electricite de France, Paris (FR)

( * ) Notice: Subject to any disclaimer, the term of this patent is extended or adjusted under 35 U.S.C. 154(b) by 345 days.

(21) Appl. No.: 13/397,975

(22) Filed: Feb. 16, 2012

(65) Prior Publication Data

US 2012/0210775 A1 Aug. 23, 2012

(30) Foreign Application Priority Data

Feb. 17, 2011 (FR) ...................................... 11 51311

(51) Int. Cl.
*G01F 23/26* (2006.01)
*F17C 13/02* (2006.01)
*G01F 23/24* (2006.01)
*G01F 25/00* (2006.01)

(52) U.S. Cl.
CPC ............ *G01F 23/247* (2013.01); *F17C 13/021* (2013.01); *G01F 25/0061* (2013.01)
USPC ........ 73/304 C; 73/290 B; 73/290 R; 73/292; 73/304 R

(58) Field of Classification Search
CPC ........... G01F 23/246; F14C 2203/0629; F14C 2221/014; F14C 2221/0161; F14C 2250/061
USPC ............. 73/290 B, 290 R, 292, 304 R, 304 C
See application file for complete search history.

(56) References Cited

U.S. PATENT DOCUMENTS

| | | | | |
|---|---|---|---|---|
| 3,321,971 A | * | 5/1967 | Llewellyn et al. | ........... 73/304 C |
| 4,135,548 A | * | 1/1979 | Sears | ............................ 137/392 |
| 4,465,088 A | * | 8/1984 | Vosper | ............................... 137/1 |
| 4,978,832 A | * | 12/1990 | Rubin | ........................... 392/400 |
| 5,031,452 A | * | 7/1991 | Dobson et al. | ............... 73/304 R |
| 5,785,425 A | * | 7/1998 | Buchanan | ........................ 374/16 |
| 6,578,415 B2 | * | 6/2003 | Schimmel et al. | ............... 73/295 |
| 6,928,869 B2 | * | 8/2005 | Ladirat et al. | .................... 73/300 |
| 6,938,479 B2 | * | 9/2005 | Carpenter et al. | ........... 73/304 C |
| 6,948,364 B2 | * | 9/2005 | Snelling et al. | .................. 73/295 |
| 7,337,662 B2 | * | 3/2008 | Sato et al. | .................... 73/304 C |
| 2007/0234796 A1 | * | 10/2007 | Tshishiku | .................... 73/290 R |

FOREIGN PATENT DOCUMENTS

| | | |
|---|---|---|
| DE | 296 15 453 U1 | 10/1996 |
| EP | 0 566 888 A1 | 10/1993 |
| FR | 2 730 309 A1 | 8/1996 |

OTHER PUBLICATIONS

Machine translation of FR 2,730,309 A1 which published on Sep. 8, 1996, translation obtained on Mar. 22, 2014.*

* cited by examiner

*Primary Examiner* — David A Rogers
(74) *Attorney, Agent, or Firm* — Drinker Biddle & Reath LLP

(57) ABSTRACT

A detector for detecting the presence of a liquid comprising a probe sensitive to the presence of the liquid on contact with it, and a casing surrounding the probe comprising: a) an opening for receiving the liquid in the casing; b) an inlet distinct from the opening for the admission of a test liquid into the casing in contact with the probe, the placing of the test liquid in contact with the probe in the casing causing the presence of the test liquid to be detected if the probe operates correctly and causing no detection in the contrary case; and c) an outlet for the discharge of a portion of the test liquid from the casing after the test liquid has been placed in contact with the probe, the discharge being sufficient for the probe to no longer detect the test liquid remaining in the casing.

10 Claims, 2 Drawing Sheets

DETECTOR OF PRESENCE OF A LIQUID

CROSS-REFERENCE TO RELATED PATENT APPLICATION

This application claims the benefit of French Patent Application No. 11 51311, filed on Feb. 17, 2011, in the French Institute of Industrial Property, the entire contents of which is incorporated herein by reference.

FIELD OF THE INVENTION

The invention relates to the detection of the presence of a liquid in a storage reservoir and in particular the test of this detector.

The detector is notably suitable for allowing the detection of a high level of liquid in a reservoir, in particular a cryogenic reservoir, that is to say a storage reservoir containing a liquid at low temperature (typically less than −50° C.).

BACKGROUND

Cryogenic liquid storage reservoirs usually comprise a double casing. The overflowing of the inner tank is a scenario with very serious consequences against which protection must be provided and which requires above all a very reliable detection. Specifically, the overflow of liquid in the annular insulation space of the cryogenic reservoir generates, by evaporation of the product placed in contact with hotter portions, a rise in pressure of the outer casing which may lead to damage to the reservoir and to a major accident.

In order to improve reliability, several types of detectors that are independent of one another are usually installed, but dependence on the individual reliability of the detectors remains. Each detector used must have an appropriate reliability, usually imposed by standards. For a detector operating continuously, the fact that it detects something and the accuracy of the detection may be sufficient to be convinced of the reliability. For a detector intended to detect an isolated phenomenon, such as the presence of a liquid in a given location or the exceeding of a high level, a test must be carried out.

The detectors of the prior art notably comprise slaved floating gauges which are tested by manually forcing them to rise, radars for which it is possible to simulate blocking out the beam, capacitors which cannot be tested in situ for the reasons cited above, or else floats which can be raised by hand.

Therefore, in liquid storage reservoirs, no level detection device of the prior art can be tested in real operating conditions without the physical level of liquid being intentionally raised to the detection threshold. On the understanding that the detection is designed to protect the reservoir against the accident described above, raising the level of liquid can be done only by filling. It therefore follows that, to test the alarm or protection device, the event initiating the feared phenomenon has to be created. If detection does not work, the consequences may be serious.

The object of the present invention is to remedy all or some of the drawbacks mentioned above, that is to say in particular to provide a liquid-presence detector that can be tested in situ in a realistic manner, without having to cause an event determining the detection and which, if it is not correctly detected, may have serious consequences.

SUMMARY

The solution of the invention relates to a detector for detecting the presence of a liquid comprising a probe sensitive to the presence of the liquid on contact with it, and a casing surrounding the probe comprising:

a) an opening for receiving the liquid in the casing, the placing in contact of the liquid with the probe in the casing causing the presence of liquid to be detected;

b) an inlet distinct from the opening for the admission of a test liquid into the casing in contact with the probe, the placing of the test liquid in contact with the probe in the casing causing the presence of the test liquid to be detected if the probe operates correctly and causing no detection in the contrary case; and c) an outlet for the discharge of at least a portion of the test liquid from the casing after the test liquid has been placed in contact with the probe, the discharge being sufficient for the probe to no longer detect the test liquid remaining in the casing.

The liquid to be tested may be of any type. In particular, it may be a liquefied gas at a temperature below −50° C. For example, it may be liquefied natural gas (LNG). It may also be another liquefied industrial gas, for example nitrogen or oxygen.

The probe in question may be of various types. It may notably comprise a float, a radar, a capacitor, or even a slaved floating gauge or else a temperature probe. It may also combine several of these elements.

The casing surrounds the probe so that liquid can be retained around this probe. The casing comprises at least one opening allowing the detection of the liquid which, reaching this opening, enters the casing up to the probe, so that the latter reacts as if there were no casing. Without this opening, the casing could serve as an obstacle to the detection of the presence of liquid.

The casing also has an inlet for the admission of a test liquid. It is a liquid capable of causing the probe to react just like the liquid the presence of which it is desired to test. The test liquid may, advantageously for the representativeness of the test and to exclude any contamination, be of the same type as the liquid the presence of which it is desired to detect. This inlet for the admission of the test liquid allows the probe to be placed intentionally in contact with the test liquid.

The casing also comprises an outlet for the discharge of the test liquid. Specifically, after the test, it is necessary to be able to return the probe to normal operating conditions, that is to say without liquid around it.

According to a particular mode, the exiting of the test liquid takes place automatically. For example, it involves one or more orifices situated in the casing at a level designed to be beneath the probe when the detector is in place. Thus the test liquid can be discharged naturally by gravity so that the probe is no longer in a detection situation. These orifices must not be too big, so that the test liquid is not discharged straight away. Specifically, the test liquid inlet must make it possible to simulate a detection, even though the discharging of the test liquid begins as soon as it enters.

After the discharge of the test liquid, a certain quantity of test liquid may remain in the casing, from the time when its presence does not cause detection.

According to a particular mode, the opening for receiving the liquid and the outlet for discharging the test liquid may be indistinguishable (for example being one and the same orifice), or partially indistinguishable (at least one orifice having both functions).

The casing and its inlets/outlets are preferably configured so that the entrance of test liquid realistically simulates the presence of liquid to be tested. The casing is preferably close to the probe and has a moderate extension, authorizing a detection in realistic conditions without it being necessary to use a large quantity of test liquid.

It can be seen that the detector, by virtue of the presence of a casing comprising specific inlets/outlets, may be tested in situ in realistic conditions, by placing the probe into the presence of test liquid. The test is reversible (unless the probe is itself irreversibly changed after a detection) and may be carried out as often as is desirable.

In one embodiment, the inlet for the admission of the test liquid is formed in order to admit a given flow rate of test liquid, the outlet for the discharge of the test liquid comprising one or more orifices collectively allowing the escape, by gravity, of a flow rate of test liquid that is less than the given flow rate. Thus the exiting of test liquid is automatic. It may begin as soon as it enters. Since the exiting flow rate is less than the inlet flow rate, a certain volume of test liquid will accumulate in the casing. When the entry flow rate of test liquid stops, the casing begins to empty. According to a particular embodiment, the orifices are situated in the bottom portion of the casing of the detector, beneath the probe.

In one embodiment, the probe is capable of detecting the presence of liquefied natural gas and the casing is configured to be able to admit and discharge liquefied natural gas as a test liquid. If the probe is a probe for the detection of presence of a cryogenic liquid such as LNG, the casing and its inlets/outlets are configured so as to be compatible with such liquids, notably with respect to the materials employed.

In one embodiment, the probe comprises a temperature sensor for detecting a temperature change due to the presence of at least one of the said test liquid and the said liquid in the casing in contact with the probe. The detection of a temperature change is an advantageous mode of detection, because a temperature change due to the presence of liquid or of test liquid is automatically communicated to the probe by thermal conduction. Moreover, the temperature detectors are well suited to cryogenic liquids. In this case, the presence of liquid is revealed by a drop in the temperature measured by the probe.

In one embodiment, the temperature sensor comprises one or more thermistors. They may be a platinum wire. The detector may be a thermocouple. There may be redundancy (several wires) in order to ensure reliable detection.

In one embodiment, the detector also comprises a temperature-maintenance system comprising a regulated hot gas inlet for maintaining a given temperature at the temperature sensor in the absence of liquid in the casing. This temperature-maintenance system is such that the probe is kept at a temperature higher than that of the liquid to be detected and of the test liquid. This system makes it possible to prevent the cold vapours of a cryogenic liquid from causing, by their contact with the probe, an inappropriate triggering that does not correspond to a presence of liquid, or of test liquid, around the probe. The temperature-maintenance system must not, on the other hand, prevent a detection of liquid, or of test liquid, when this liquid effectively comes into contact with the probe. It should be noted that this temperature-maintenance system must not be confused semantically with the temperature compensation that may exist for thermocouples. The entrance of hot gas may be regulated by a valve, a control valve, a flow-rate or other regulation valve, so as to maintain the given temperature at the temperature sensor.

In one embodiment, the temperature-maintenance system is configured to cause a gas to circulate around the probe so as to maintain the given temperature. The system allows a provision of heat in order to counter notably a cooling of the probe due to the presence of cold vapours. This embodiment of the temperature-compensation system is both effective from the point of view of the temperature maintenance and sufficiently "weak" to not counter the detection of a temperature change due to the presence of liquid. Specifically, since the liquid to be detected has a calorific capacity that is markedly greater than the gas provided by the temperature-maintenance system, the effect of this maintenance system is rapidly dominated by the presence of liquid.

The invention also relates to a reservoir for storing a liquid comprising a detector as described above. The detector may be fixed or movable in the reservoir. It is possible notably to fix it in a location where, due to its position, it is used to detect the presence of the stored liquid at a given level in the reservoir.

In one embodiment, the reservoir also comprises a roof, the detector being located on the roof in order to detect a high level of the liquid, beyond a threshold defined by the position of the detector in the reservoir. Thus the function of the detector is to detect a high level, or even a very high level depending on its position. It remains testable in situ by virtue notably of its casing.

In one embodiment, the reservoir also comprises an extraction pipe for extracting the liquid and for carrying at least a portion of the liquid to the inlet of the casing for use as a test liquid. By virtue of this pipe, the liquid stored in the reservoir may be used as test liquid for the detector. According to a variant, the test liquid may come from another reservoir. This other reservoir may be similar to the reservoir in question. This other reservoir may be of a different type, the liquid that it contains then having to be able to be used as a test liquid for the probe of the first reservoir.

Finally the invention relates to a test method using a reservoir as described above, comprising the following steps:

a) admission of test liquid into the casing;
b) noting the detection or the non-detection by the probe of the presence of the test liquid; and
c) discharge of at least a portion of the test liquid admitted into the casing in step a) so that the probe no longer detects the presence of the test liquid.

In order to carry out the test in concrete terms, the test liquid is fed into the casing through the inlet provided for this purpose. It is then possible to note whether or not the probe, placed in the presence of the test liquid, reacts. If it reacts, the test is conclusive, otherwise it is necessary to examine the cause of the non-detection, which will usually be a failure of the probe. The test liquid must be discharged after the test, enough in any case to cause detection to cease.

All the particular modes evoked above for a detector or a reservoir according to the invention apply mutatis mutandis to the test method according to the invention.

According to one particular embodiment, the reservoir being in service, the stored liquid is used as a test liquid. This has the advantage, already mentioned above, of making the test truly representative.

BRIEF DESCRIPTION OF THE DRAWINGS

Other particular features and advantages of the present invention will appear in the following description of non-limiting exemplary embodiments, with reference to the appended drawings in which.

For reasons of clarity, the dimensions of the various elements shown in these figures are not necessarily in proportion with their real dimensions. In the figures, identical references correspondent to identical elements.

DETAILED DESCRIPTION

Figure 1:
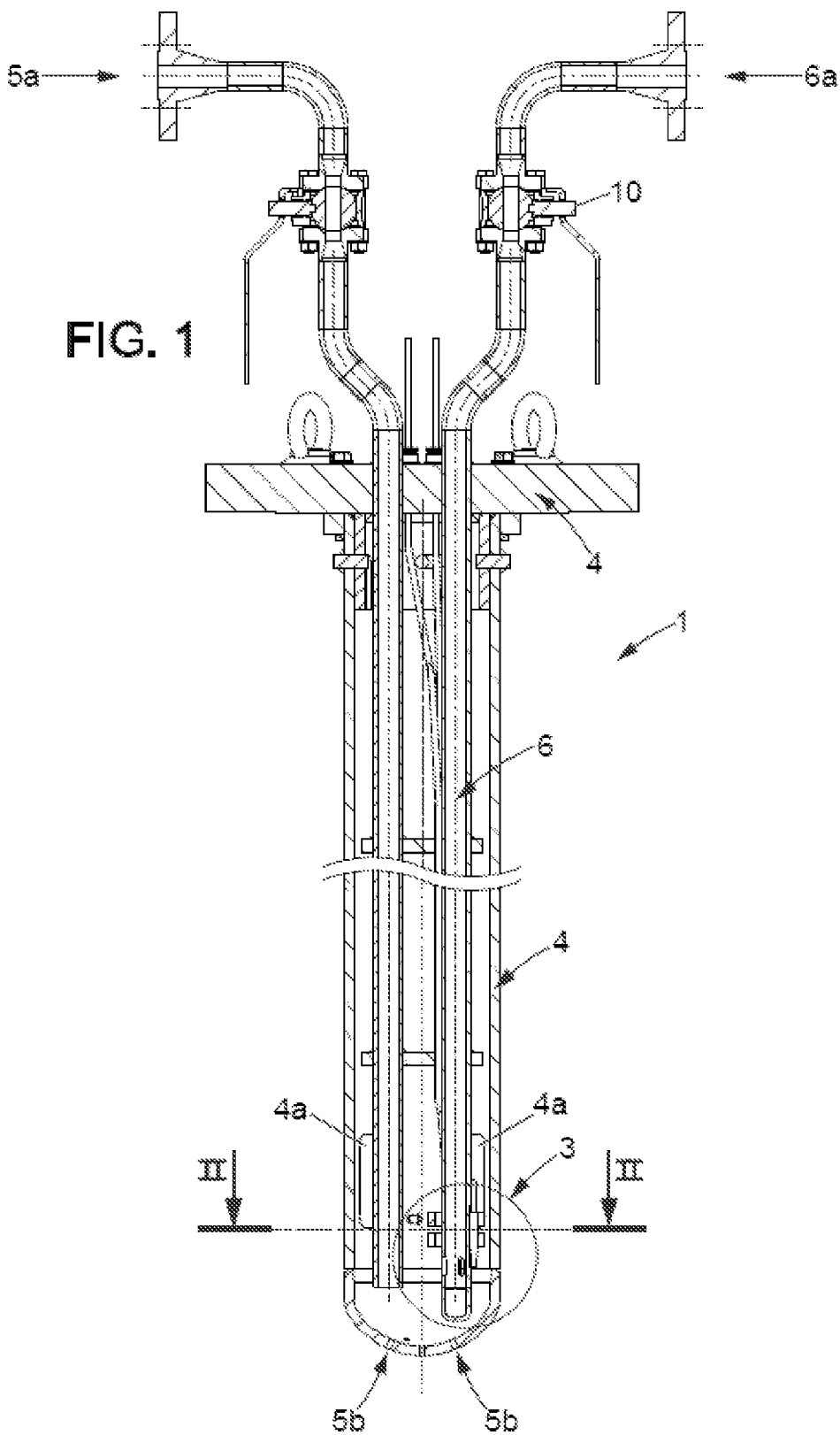
FIG. 1 represents a front view in section of a detector according to the invention.

FIG. 1 shows a detector 1 according to the invention. It incorporates a probe 3 sensitive to the presence of liquefied natural gas (or LNG) in its vicinity. This probe is usually designed to be connected to an alarm or automatic action system. The probe envisaged here is used to detect a temperature change due to contact with the LNG.

The detector comprises a casing 4 provided with a flange for attaching the detector in a reservoir. The casing comprises a portion with a generally tubular shape and surrounds the probe. It comprises intakes 4a which form openings for receiving the liquid into the casing. Thus, a liquid that might surround the casing, for example following the rise of the level of this liquid in a reservoir, could only enter the casing and, if the probe is working, cause a detection.

The casing 4 also comprises an inlet 5a for the admission of a test liquid, for example liquefied natural gas, capable of causing the probe to react. This inlet, in the example, takes the form of a pipe provided with a stop valve making it possible to conduct the test liquid to the bottom of the casing 4, at the level of the probe 3, the arrival of test liquid simulating the arrival of liquid to be detected without it being necessary to intervene directly on the probe itself.

The casing 4 also comprises orifices 5b situated at the bottom of the casing, the function of which it to allow a liquid present in the casing, notably the test liquid, to be discharged. The inlet 5a and the outlet 5b interact to admit a quantity of test liquid that is capable of causing the probe to react. The orifices are a priori quite small in order that the filling via the inlet 5a is not in vain, that is to say that the casing does not empty as quickly as it fills.

The casing also comprises a system 6 for maintaining the temperature of the probe in the absence of liquid. In the example shown, this is a pipe used to convey a hot gas relative to the liquefied natural gas vapours which are in fact natural gas at a temperature between −165° C. approximately and the ambient temperature. According to a particular mode, the hot gas is also inert. For example, this gas may be industrial quality nitrogen obtained by cryogenic separation. According to another example, this gas is natural gas if it is available. This gas is inserted at a temperature close to the ambient temperature, that is to say well above that of the LNG (approximately −165° C.).

The temperature-maintenance system shown is a pipe provided with an inlet 6a and a stop valve 10. The inlet 6a is used to conduct the hot gas to the probe 3, having the effect of keeping this probe at a sufficient temperature to prevent the probe being cooled by the LNG vapours. The stop valve 10 is used to regulate the hot gas of the inlet 6a in order to keep the probe 3 at temperature. It will be understood that this example is purely illustrative and that the stop valve 10 may take the form of a system for regulating a gas flow in a pipe such as a control valve, a flow rate or other regulation valve.

Figure 2:
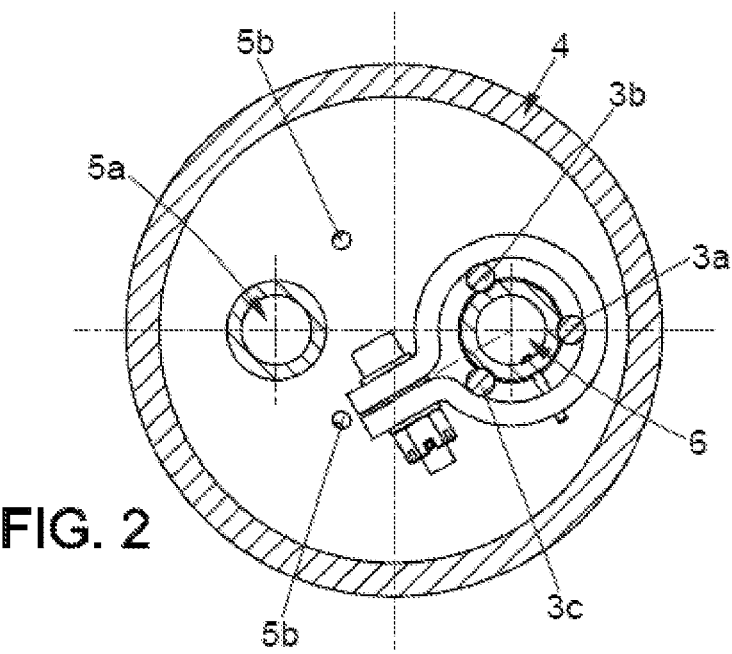
FIG. 2 represents a section of the detector of FIG. 1 along a plane II-II situated in the detection probe.

FIG. 2 is a section along a plane II-II at right angles to the vertical axis of the detector of FIG. 1. It shows the casing 4 which comprises a cylindrical tube with a circular base, the inlet 5a for admitting the test liquid and the system 6 for maintaining temperature. Also shown are the orifices 5b situated at the bottom of the casing 4.

The probe in this instance consists of three thermistors 3a, 3b and 3c placed against the temperature-maintenance system. They are for example platinum wire thermistors. The sensitive portion of the thermistors is situated at the reference number 3 of FIG. 1, close to the intakes 4a. The thermistors may be retained by a clamping collar.

More precisely, the wires of the thermistors have a resistance of 100 ohms at 0° C., which falls substantially in the presence of cold. Such an arrangement is routinely employed inside LNG reservoirs. Feedback has shown that this equipment is capable of detecting the presence of LNG. The wires are normally connected to a junction box not shown.

Figure 3:
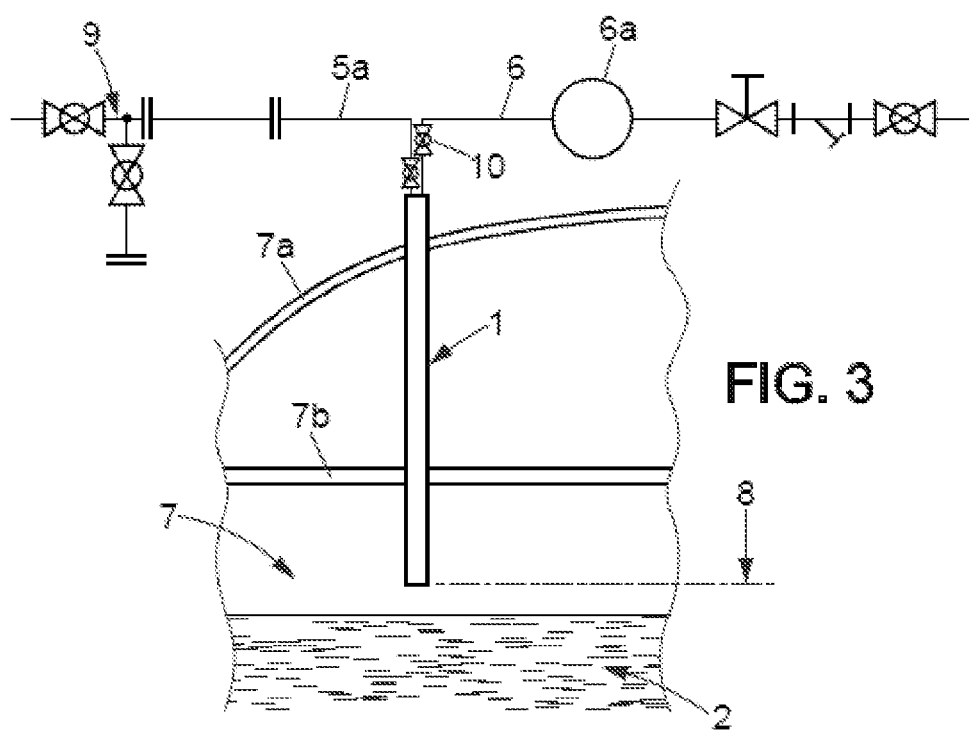
FIG. 3 illustrates schematically a reservoir fitted with a detector according to the invention.

FIG. 3 illustrates a portion of a reservoir 7 for storing LNG 2. The reservoir has a dome-shaped roof 7a and a second roof 7b for thermal insulation between the LNG at approximately −165° C. and the top portions of the reservoir. A detector 1 according to the invention is fixed to the dome. The casing passes through the roof 7b, at least in its bottom portion. The probe 3 is at a level 8 inside the reservoir beneath the roof 7b. The detector is used to detect whether the LNG exceeds this level 8.

In its portion outside the reservoir, the detector is connected on the one hand by the inlet 5a to a source of test liquid and, on the other hand, by the temperature-maintenance system 6 to a source of natural gas or of nitrogen at ambient temperature. This source of nitrogen or of natural gas comprises a flowmeter 6a. The natural gas may come from a gas network not shown and the nitrogen may come from the vaporization of nitrogen stored in liquid form in a reservoir not shown. In the example, the source of test liquid is a pipe 9 of LNG that can be supplied by the LNG of the reservoir 7 itself. It should be noted that only the top portion of the pipe is shown. According to a variant, the pipe 9 could be connected to a reservoir other than the reservoir 7, this other reservoir serving as a source of test liquid.

In order to test the detector shown in FIGS. 1, 2 and 3 in situ, the test liquid is admitted into the casing 4. The test liquid arrives via the inlet 5a and is conducted to the level of the probe 3. The latter, if it is operating correctly, then sends a signal that the presence of liquid is detected. If no signal is sent, then:

the probe 3 is not operating correctly,
or the test has not been carried out correctly.

However, this second alternative is limited in probability notably by the fact that the test liquid is discharged through the orifices 5b, of reduced section relative to the inlet 5a. This discharge takes place naturally by gravity at a flow rate that is therefore less than the flow rate of admission of test liquid. Then, the probe is rapidly returned to normal conditions, that is to say with no liquid around it.

It will be noted that the casing, by virtue of the openings 4a, does not prevent the liquid contained in the reservoir, if it were to rise to the level 8, from entering the casing and being detected by the probe. The casing used for the test does not therefore interfere with the normal operation of the detector.

The piping 6 makes it possible to provide a gas that is hotter than the vapours contained in the reservoir and thus prevent an inappropriate triggering of the probe. It is preferable during the test to leave this temperature-maintenance system active. It is then possible to test that it does not hamper the detection of the liquid. Specifically, the detection is based on the principle that the effect of the system for maintaining the temperature of the probe is dominated by the thermal effect due to the presence of cold liquid around the probe.

Naturally, the present invention is not limited to the embodiment described above as an example; it applies to other variants.

Typically, the arrangement of the orifices 5b, or else of the openings 4a, although advantageous, is presented above as a non-limiting example. For example, it is possible to provide orifices 5b with a greater or lesser section depending on the time it is desired for the liquid to remain in the casing of the probe.

What is claimed is:

1. A detector for detecting the presence of a liquid comprising a probe sensitive to the presence of the liquid on contact with it, and a casing surrounding the probe comprising:
  a) an opening for receiving the liquid in the casing, the placing in contact of the liquid with the probe in the casing causing the presence of liquid to be detected;
  b) an inlet distinct from the opening for the admission of a test liquid into the casing in contact with the probe, the placing of the test liquid in contact with the probe in the casing causing the presence of the test liquid to be detected if the probe operates correctly and causing no detection in the contrary case;
  c) an outlet for the discharge of at least a portion of the test liquid from the casing after the test liquid has been placed in contact with the probe, the discharge being sufficient for the probe to no longer detect the test liquid remaining in the casing,
  wherein the probe comprises a temperature sensor for detecting a temperature change due to the presence of at least one of the said test liquid and the said liquid in the casing in contact with the probe; and
  (d) a temperature-maintenance system comprising a regulated hot gas inlet for maintaining a given temperature at the temperature sensor in the absence of liquid in the casing.

2. The detector according to claim 1, wherein the inlet for the admission of the test liquid is formed in order to admit a given flow rate of test liquid, the outlet for the discharge of the test liquid comprising one or more orifices collectively allowing the escape, by gravity, of a flow rate of test liquid that is less than the given flow rate.

3. The detector according to claim 1, wherein the probe is capable of detecting the presence of liquefied natural gas and the casing is configured to be able to admit and discharge liquefied natural gas as a test liquid.

4. The detector according to claim 1, wherein the temperature sensor comprises one or more thermistors.

5. The detector according to claim 1, wherein the temperature-maintenance system is configured to cause a gas to circulate around the probe so as to maintain the given temperature.

6. A reservoir for storing a liquid comprising a detector according to claim 1.

7. The reservoir according to claim 6, further comprising a roof, the detector being located on the roof in order to detect a high level of the liquid, beyond a threshold defined by the position of the detector in the reservoir.

8. The reservoir according to claim 6, further comprising an extraction pipe for extracting the liquid contained in the reservoir and for carrying at least a portion of the said liquid to the inlet of the casing for use as a test liquid.

9. A test method using a reservoir according to claim 6, comprising the following steps:
  a) admission of test liquid into the casing;
  b) noting the detection or the non-detection by the probe of the presence of the test liquid; and
  c) discharge of at least a portion of the test liquid admitted into the casing in step a) so that the probe no longer detects the presence of the test liquid.

10. The method according to claim 9, wherein, the reservoir being in service, the stored liquid is used as a test liquid.

* * * * *